United States Patent [19]
Rollins et al.

[11] 3,818,673

[45] June 25, 1974

[54] METHOD AND APPARATUS FOR PACKAGING COMPRESSIBLE MATERIALS

[75] Inventors: Forrest Theodore Rollins, Englewood, Colo.; Frank Steve Kubovich, Rossford, Ohio; Kenneth Benning Buess, Littleton, Colo.; Donald Joseph Hartzell, Defiance, Ohio

[73] Assignee: Naremco, Inc., Springfield, Mo.

[22] Filed: Nov. 21, 1972

[21] Appl. No.: 308,372

[52] U.S. Cl............... 53/24, 53/124 D, 53/124 TS, 100/185, 100/209, 100/218
[51] Int. Cl............................................. B65b 63/02
[58] Field of Search .. 53/24, 124 D, 124 TS, 124 E; 100/185, 189, 209, 218

[56] References Cited
UNITED STATES PATENTS

| | | | |
|---|---|---|---|
| 2,587,997 | 3/1952 | Guettler | 100/186 |
| 3,382,643 | 5/1968 | Hullhorst et al. | 53/124 D X |
| 3,481,268 | 12/1969 | Price et al. | 53/124 E X |
| 3,576,161 | 4/1971 | Wright | 100/218 X |

*Primary Examiner*—Travis S. McGehee
*Attorney, Agent, or Firm*—Robert M. Krone; John D. Lister

[57] ABSTRACT

A method of packaging compressible materials utilizes an apparatus comprising an open ended hopper with a reciprocating ram therein for compressing materials and a package loading chute at each end of the hopper or compression chamber. The materials to be compressed are placed in the hopper. The ram then moves across the hopper compressing the materials and expelling them from the hopper into one of the chutes. A ram in the chute having the compressed material then expells the compressed material from the chute into a package. While the compressed materials are being expelled from the chute, the hopper is being loaded for the next packaging operation.

12 Claims, 7 Drawing Figures

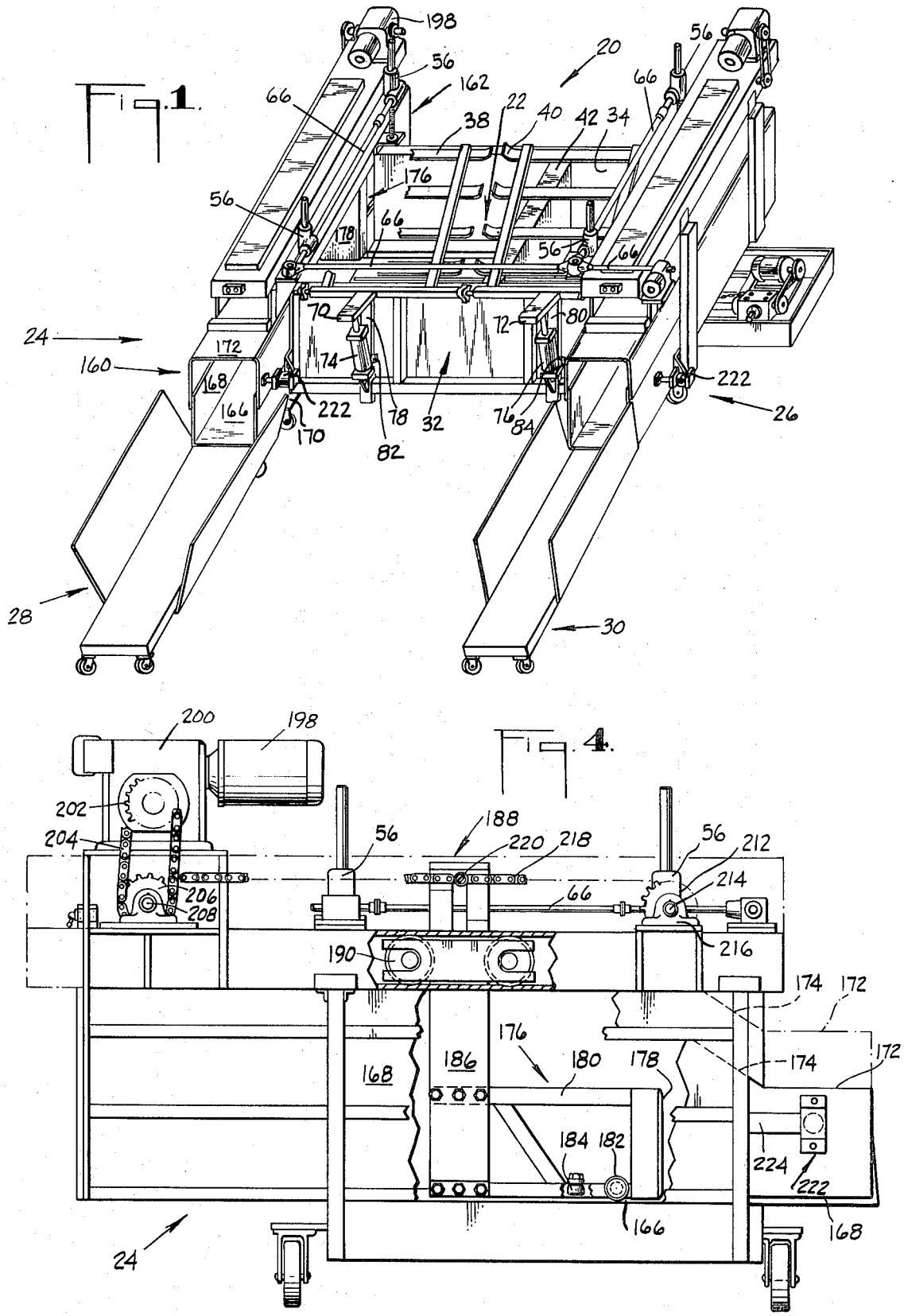

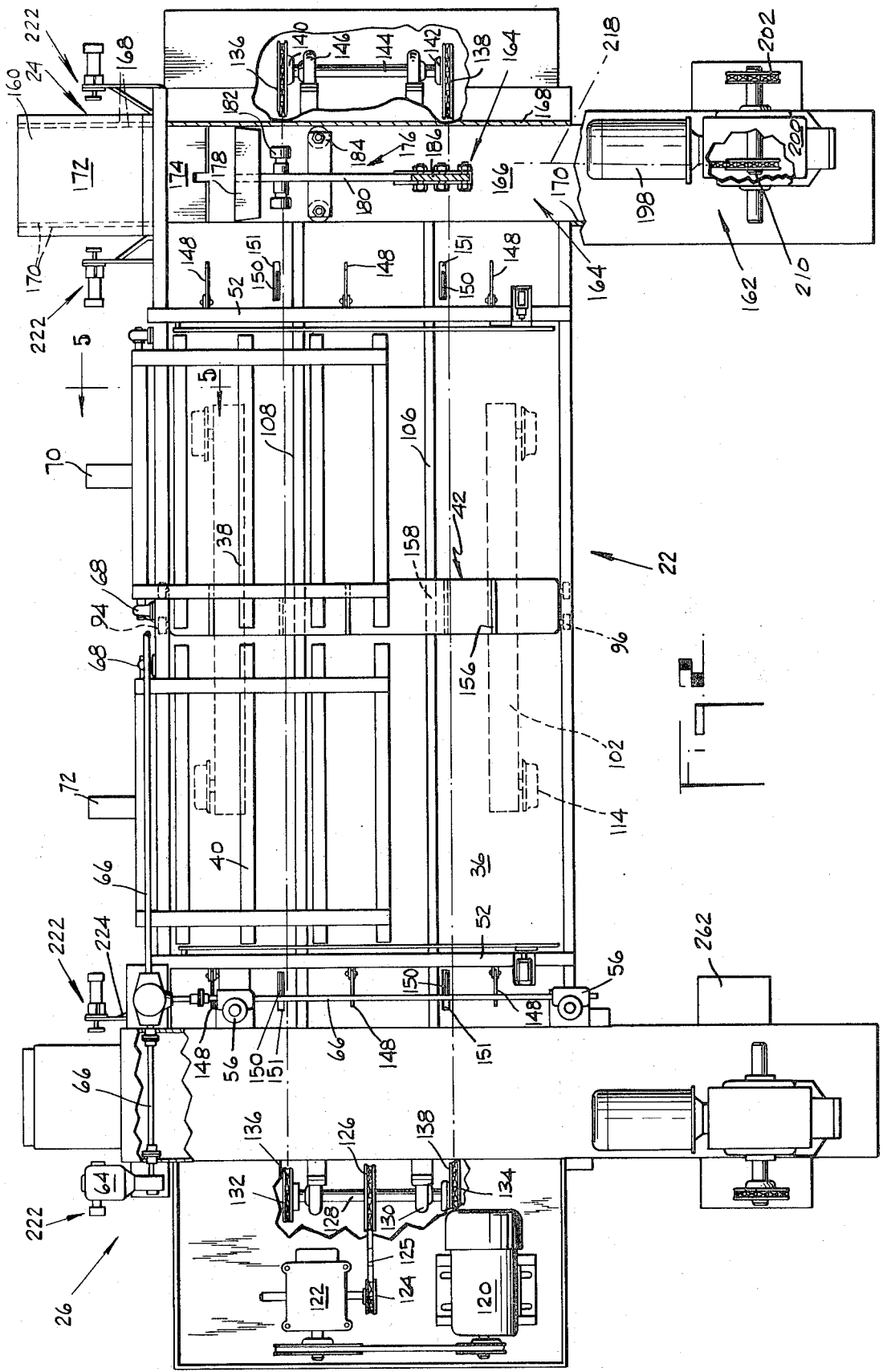

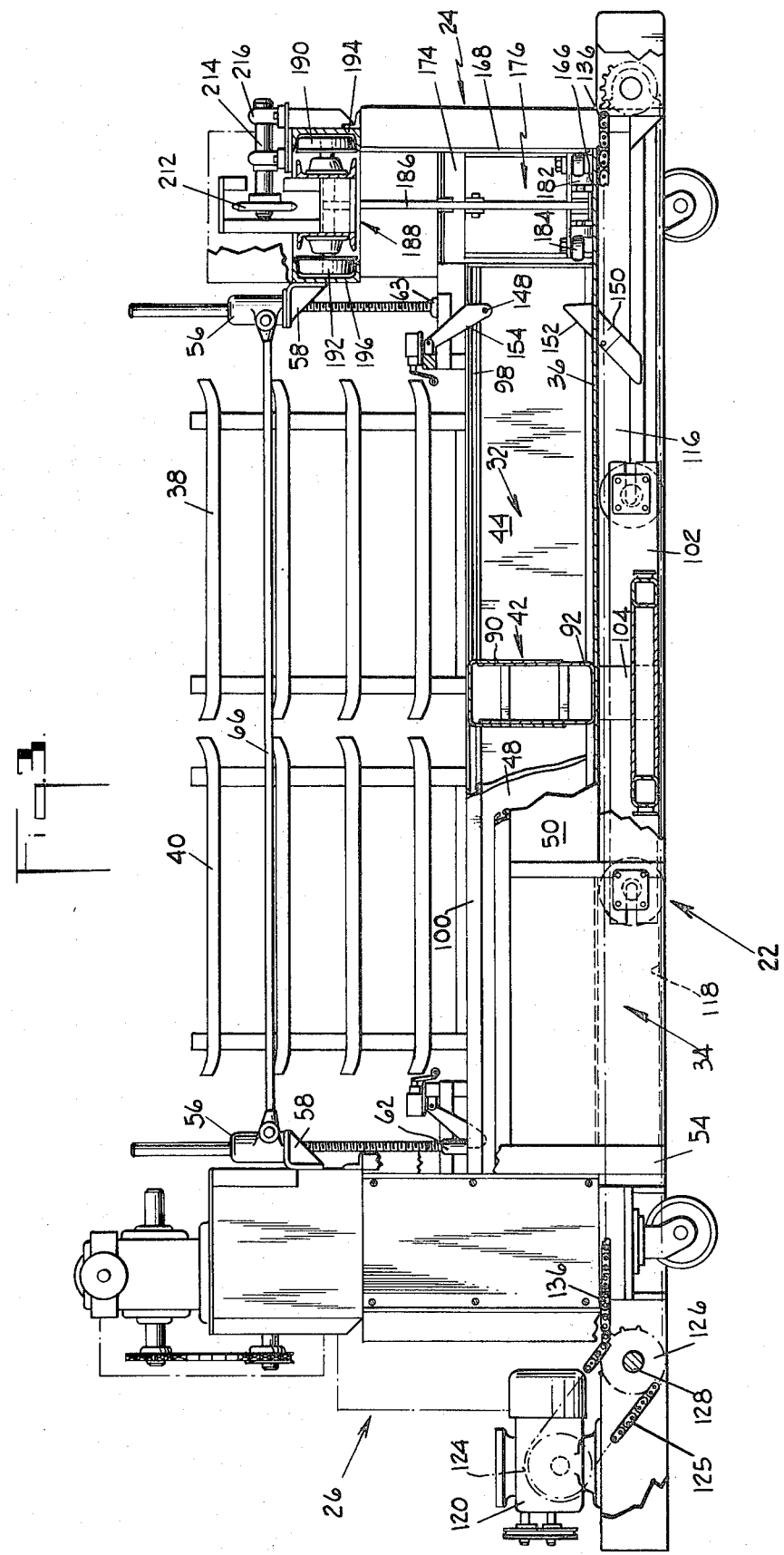

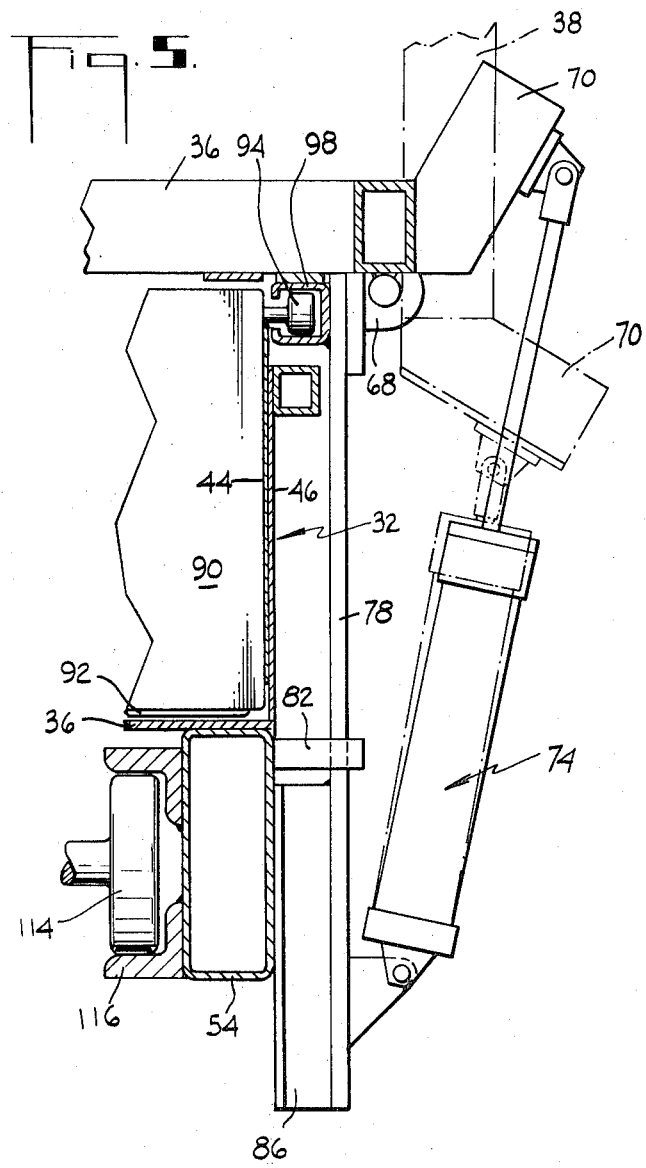

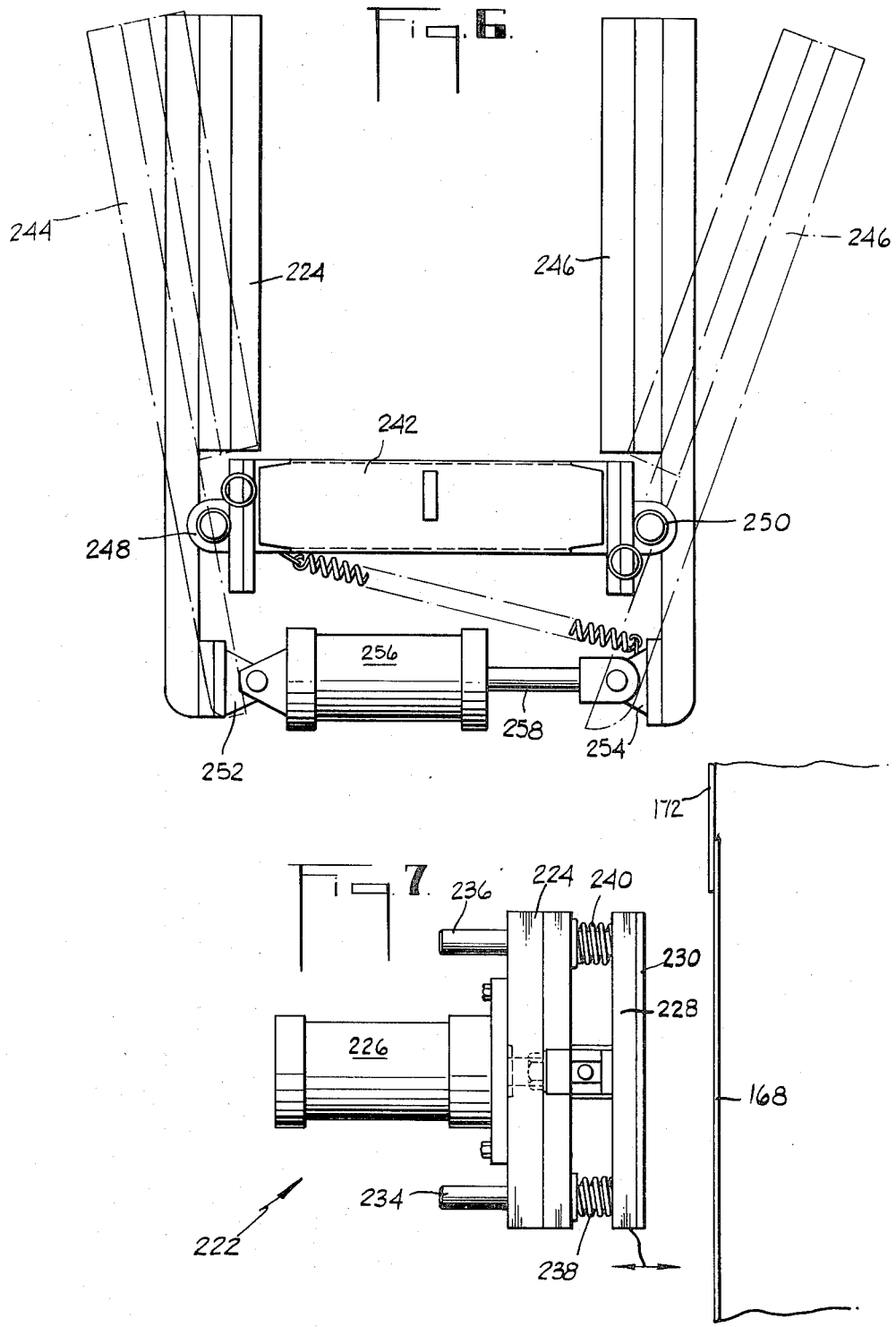

METHOD AND APPARATUS FOR PACKAGING COMPRESSIBLE MATERIALS

BACKGROUND OF THE INVENTION

This invention relates to the packaging of compressible materials by compressing such materials and inserting the materials into bags or other packages while the materials are in a compressed state. More specifically this invention relates to a method and apparatus for packaging compressible materials such as fiber glass insulation.

Conventional packaging equipment normally used to package fiber glass insulation requires the individual batts of insulation to be stacked vertically. While the batts of insulation are not heavy, the need to stack these batts vertically does require the lifting of some of the batts to at least the height of the operator and when this stacking has to be repeated over an eight hour working shift such a method of loading the equipment becomes undesirable.

Conventional packaging equipment is pneumatically or hydraulically operated and produces only one package per a complete operating cycle. The time required to load the equipment with insulating material after a packaging cycle is completed plus the time required for the equipment to complete its packaging cycle, limits the number of packages which can be produced per unit time. Due to the ever increasing productivity per machine hour of the machines producing fiber glass insulation, the designed capability of existing packaging equipment has been exceeded by the output of the machines producing insulation. Because this equipment is being operated through cycles which approach or exceed the design capability of the equipment, mechanical breakdowns and servicing requirements for the machines are now more frequent. This obviously only compounds the problem of providing the necessary packaging capacity for the insulation producing machines.

One form of relief has been to provide additonal work crews and additional units of equipment. However, this is economically undesirable. In addition, due to the high volume-to-weight ratio of fiber glass insulation, the machines must be quite large. Consequently, with the limited amount of floor space that is generally available, the use of additional packaging equipment soon becomes impractical.

SUMMARY OF THE INVENTION

In view of the above, it is an object of the present invention to provide a method and apparatus for packaging insulation, as well as other compressible materials, which can produce two packages per cycle and permit the loading of the apparatus for the next packaging operation while a packaging operation is in progress. It is a further object to eliminate the need to lift the insulating material to the heights required to load conventional packaging equipment. The present invention accomplishes the above in the limited floor area available for such packaging operations and without increasing the crew size required.

Accordingly, the present invention comprises an apparatus for packaging compressible materials which has an open ended hopper or compression chamber with a reciprocating ram therein for compressing materials in the hopper and alternately ejecting the materials from the hopper into one of two package loading chutes. The materials are ejected in their compressed state from the chutes into bags or other packages by rams within in the chutes. While the compressed materials are being ejected from one chute into a package, the hopper is being loaded with compressible material which will be compressed and ejected into the other chute for packaging. Thus, the apparatus performs two complete compressing and packaging operations per cycle.

BRIEF DESCRIPTION OF THE DRAWINGS

FIG. 1 is a perspective view of the apparatus of the present as viewed from the bagging side of the apparatus;

FIG. 2 is a plan view of the apparatus with portions broken away to better illustrate certain components of the apparatus;

FIG. 3 is an elevational view from the loading side of the apparatus with portions broken away to better illustrate certain components of the apparatus;

FIG. 4 is a side view of the apparatus with portions broken away to better illustrate certain components of the apparatus;

FIG. 5 is a partial cross-sectional view taken along lines 5—5 of FIG. 2;

FIG. 6 is transverse cross-sectional view of the bag table assembly utilized with the apparatus of the present invention; and FIG. 7 is a side view of a bag clamp utilized in the apparatus of the present invention.

DESCRIPTION OF THE PREFERRED EMBODIMENT

As shown in FIG. 1, the apparatus 20 of the present invention comprises a hopper 22, a pair of package loading chutes 24 and 26, and a pair of bag tables 28 and 30.

The hopper 22 comprises a pair of side walls 32 and 34 plus a bottom wall 36. The ends of the hopper and the top of the hopper are open. The hopper is provided with a pair of hold down gates 38 and 40 which function to maintain the insulating material within the hopper during the compression of the material and a platen or ram 42 which compresses material and ejects material from the hopper.

The side walls 32 and 34 are each made up of upper and lower sections so that the height of the hopper can be adjusted to accommodate insulation batts of different widths (e.g., most home insulations are either 15 or 23 inches wide by 48 inches long). As best shown in FIG. 5, side wall 32 has an upper section 44 and a lower section 46. As best shown in FIG. 3, side wall 34 has an upper section 48 and a lower section 50. The lower sections 46 and 50 of the side walls are stationary and affixed to the frame 54 of the apparatus. The upper sections 44 and 48 of the side walls are inside the lower sections, are in sliding engagement with the lower sections, and can be raised and lowered in vertical planes. Sections 44 and 48 are connected together by means of cross members 52 which are welded or otherwise secured to upper rails of the sections and to the frame 54 through four screw jack assemblies 56.

The screw jack assemblies 56 are each mounted on separate brackets 58 which are welded or otherwise affixed to the frame 54. Lower ends of screws 60 of the jack assemblies are retained in collars 62 which are welded or otherwise affixed to the upper rail of the upper wall section 48 adjacent to the ends of that rail and in collars 63 carried on plates welded or otherwise affixed to the cross members 52 adjacent upper wall section 44. The collars 62 and 63 permit the rotation of the screws 60 but prevent axial movement of the screws 60 relative to the collars. Thus, when the screw jack assemblies 56 are operated the upper sections 44 and 48 of the side walls are raised or lowered relative to the lower sections 46 and 50 of the side walls. The screw jack assemblies are powered by a reversible motor 64 which can be actuated to raise or lower the screws of the jack assemblies. The motor is mounted on the frame 54 and is connected to the jack assemblies 56 through drive shafts 66.

The hold down gates 38 and 40 are each pivotally mounted on hinge assemblies 68 which in turn are welded or otherwise affixed to the upper rail of wall section 44. The gates thus pivot about a horizontal axis parallel to the side wall 32 of the hopper. The gates are each provided with brackets 70 and 72 which project outwardly from the gates on the opposite side of the pivotal axis of the gates.

A pair of double acting pneumatic or hydraulic piston and cylinder assemblies 74 and 76 are utilized to effect the pivotal movement of the gates about their horizontal axis. Piston rods of the hydraulic cylinder assemblies 74 and 76 are pivotally secured at their outer ends to brackets 70 and 72. The other ends of the hydraulic cylinder assemblies are pivotally secured to support plates 78 and 80.

The support plates 78 and 80 are secured to the rail of the upper wall section 44 at their upper ends and are slideably mounted in guides 82 and 84 adjacent their lower ends. The guides 82 and 84 each comprise a pair of blocks having slots therein which receive the edges of plates 78 and 80 and guide the plates 78 and 80 in vertical planes. A lower portion of each support plate has a longitudinally extending flange (e.g., flange 86, FIG. 5) at the center line extending toward and in sliding engagement with the frame. The flanges together with the guides 82 and 84 keep the support plates 78 and 80 in proper alignment. With this construction the double acting cylinder assemblies 74 and 76 move with the upper section 44 of the side wall 32 so that the hydraulic cylinders can effect the pivotal movement of the gates 38 and 40 in whatever position the wall sections are disposed.

The ram 42 comprises upper and lower sections 90 and 92 respectively. The sections are both substantially channel shaped with the upper section fitting over and being in sliding contact with the lower section of the ram. Each end of the upper section 90 of the ram is provided with a pair of wheels 94 and 96 which ride in channels 98 and 100 that form the upper rails of upper wall sections 44 and 48. The channel shaped rails 98 and 100 not only guide the ram as it moves the length of the hopper but in addition the rails provide a means for adjusting the height of the ram within the hopper. Since the wheels 94 and 96 are affixed to the upper section of the ram when the upper wall sections 44 and 48 of the hopper are raised, the upper section 90 of the ram is also raised a corresponding amount so that the height of the ram corresponds to the height of the hopper.

The lower section 92 of the ram is carried on a generally H-shaped carriage 103 located beneath the floor 36 of the hopper. The lower section of the ram is connected to the carriage by a pair of vertical plates 104 which pass through longitudinally extending slots 106 and 108 of floor 36. The vertical support plates 104 are welded or otherwise secured to the cross-member of the carriage 102. The lateral frame members 110 and 112 of the carriage are provided with wheel assemblies 114 at their ends which ride in longitudinally extending channel shape tracks 116 and 118 that are welded or otherwise affixed to the frame.

The ram 42 is powered by a reversible motor 120 through a gear reducer 122 and chain and sprocket assemblies. A sprocket 124 on the output shaft of the gear reducer is connected by a drive chain 125 to a sprocket 126 on a shaft 128 that is rotatably mounted on the frame by bearing assemblies 130. Each end of shaft 128 is provided with a sprocket 132 and 134 about which drive chains 136 and 138 are trained. At the other end of the packaging assembly drive chains 136 and 138 are trained about a pair of sprockets 140 and 142 that are mounted on a shaft 144 which is rotatably mounted in bearing assemblies 146. The upper runs of drive chains 136 and 138 intermediate their respective sprockets are affixed to the carriage 102 of the ram so that the carriage and consequently the ram will move longitudinally relative to the hopper when the drive chains 136 and 138 are driven by motor 120. Since motor 120 is a reversible motor, the drive chains 136 and 138 can be utilized to reciprocate the ram back and forth along the length of the hopper.

Each end of the hopper 22 is provided with three upper and two lower finger stops 148 and 150 respectively. These finger stops are used when it is desired to package more material in a bag than can be loaded into the hopper for one compressing operation. The fingers 148 and 150 function to prevent compressed material in either one of the chutes 24 and 26 from expanding back into the hopper when the ram 42 is not acting as a side wall of the chute.

The upper finger stops 148 are each pivotally mounted at one end on cross-members 52 and can swing from a first position where they extend below the upper surface of the ram 42 to a second position where they are level with or above the upper surface of the ram 42. The lower platen finger assemblies 150 are pivotally mounted at their mid-section just beneath the floor 36 of the hopper and extend upwardly through slots 151 in the floor of the hopper.

The lower portions of the fingers 150 are heavier than the upper portions. The additional weight of the lower portions of the fingers 150 causes the fingers 150 to pivot about their axis until the upper portions of the fingers project upward through the floor 36 of the hopper with the leading edges 152 of the fingers in contact with the inner ends of the slots 151.

The leading edges 152 of fingers 148 and leading edges 154 of the fingers 150 are both inclined outwardly from the center of the hopper so that as the ram pushes material into one of the chutes 24 and 26 the fingers are swung out of the way by the material. As the ram 42 comes into vertical alignment with the fingers 148 and 150, slots 156 and 158 in the upper and lower ram sections 90 and 92 permit the upper fingers to swing down to their first position and the lower fingers to pivot about their axis until the upper portions of these fingers project above the floor 36. The trailing edges of both sets of fingers lie in a vertical plane when the fingers are in this position and thus act as a stop to prevent the compressed material from expanding back into the hopper when the ram 42 is withdrawn.

The chute assemblies 24 and 26 that are located at the ends of the hopper 22 are substantially identical in construction. Consequently, only one of the package loading chutes will be described in detail to avoid unnecessary repetition.

Chute 24 comprises a discharge portion 160, a ram housing portion 162 and a mid portion 164. The discharge portion 160 is located on one side of the hopper while the ram housing portion 162 is located on the opposite side of the hopper. The chute has a common floor 166, a vertically extending outer wall 168 and a discontinuous inner wall 170. The discontinuous inner wall 170 provides an opening in the chute which is coextensive with the open end of the hopper 22. In this way, the ram 42 can eject material from the hopper into the chute 24 with the ram 42 forming the middle portion of the chute inner side wall when material is in the chute. The discharge portion 160 of the chute is provided with an upper channel shaped section 172 which is affixed to the upper section 44 of side wall 32. The channel shaped section 172 fits over side walls 168 and 170 of the chute and since the channel shaped member 172 is secured to the upper section 44 side wall 32, it adjusts the discharge opening of the chute in accordance with the size of the material being packaged. The inner end of channel 172 has an upwardly inclined plate 174 extending therefrom to assure the smooth transition of the material into the discharge end of the chute as the material is being ejected from the chute into a package.

The chute 24 is provided with a ram 176 which is reciprocated back and forth within the chute. The ram comprises a face plate 178 mounted on a carriage 180. The carriage is provided with a pair of wheels 182 adjacent the forward end of the ram which rotate about a horizontal axis and ride on the floor 166 of the chute. In addition, the carriage 180 is provided with a pair of wheels 184 located on either side of the carriage 180 just behind the wheels 182. The wheels 184 rotate about a vertical axis and are adapted to roll along the side walls 168 and 170 plus the face of the ram 42. Thus, the wheels 182 and 184 serve to both support and guide the ram within the chute 24.

The rear of the carriage 180 is bolted or otherwise secured to a vertically extending plate 186. The plate 186 extends upward through the chute to a carriage 188. The carriage 188 is provided with two sets of wheels 190 and 192 which ride in channel shaped tracks 194 and 196 respectively. The wheels 190 and 192 not only support the carriage but cooperate with the tracks 194 and 196 to guide the carriage 176 parallel to the longitudinal axis of the chute 24.

The carriage is driven by a reversible motor 198 through a gear reducer 200 and chain and sprocket assemblies. The output shaft of the gear reducer 200 has a sprocket 202 thereon which drives a drive chain 204. The drive chain 204 in turn drives a sprocket 206 on a shaft 208. A second sprocket 210 is mounted on the other end of the shaft 208 in alignment with a sprocket 212 which is located at the discharge end of the chute. The sprocket 212 is mounted on a shaft 214 which is rotatably mounted in bearings 216 on the frame of the machine. A drive chain 218 is trained about the sprockets 210 and 212. The upper run of the chain between the sprockets 210 and 212 is secured to the carriage 188 by a stud 220 which secures a link of the chain to the upper portion of the carriage. In this way with the reversible motor 198, the ram 176 can be reciprocated back in forth in chute 24. Due to the fact that the ram extends forward from plate 186 the ram can enter the discharge portion of the chute without plate 186 contacting the plate 174 of discharge portion. In this way the face 178 of the ram can pass through the discharge portion to assure that the material is ejected from the chute.

As best shown in FIGS. 1, 2 and 6, the discharge portions of chutes of 24 and 26 are each provided with a pair of bag clamps 222. The bag clamps 222 are located on opposite sides of each chute and are adapted to clamp the open end of a bag about the respective chute. The units are mounted on brackets 224 which are secured to the frame of the machine.

Each bag clamp comprises a double acting pneumatic cylinder 226 and a plate 228 with a rubber pad 230 on its major surface which cooperates with the side wall of the chute to clamp the open end of a bag in place between the pad and the side wall. The pneumatic cylinder 226 is secured to the bracket 224 with a piston rod 230 of the pneumatic cylinder 226 projecting through the bracket and secured to the plate 228. The plate 228 is provided with a pair of rods 234 and 236 which pass through the mounting bracket 224 on opposite sides of the piston rod 230 to keep the plate from rotating. Shock absorbing springs 238 and 240 are interposed between the back face of plate 228 and an opposing face of the bracket 224 to prevent the plate from striking the bracket when it is withdrawn from its clamping position. The springs 238 and 240 are normally maintained in a compressed state by air pressure within the pneumatic cylinder which holds the piston rod 230 and consequently, the plate 228 in a retracted position. When the pneumatic cylinder 232 is vented and pressurized to extend the piston rod 230, the springs 238 and 240 assist in forcing the pad 228 of the bag clamp into contact with the side wall of the chute.

The bag tables 28 and 30 are best shown in FIGS. 1 and 6. Since the bag tables are identical in construction, only bag table 28 will be discussed in detail. The bag tables comprise a floor or base plate 242 and a pair of pivotally mounted side walls 244 and 246 respectively. The base plate 242 is located at the same level as the floor 166 of the chute 24 so that the bag will be supported at the proper level for loading. The side walls 244 and 246 are each pivotally mounted on hinge assemblies 248 and 250 secured to the lower edges of the side walls and to the sides of base plate 242. These side walls 244 and 246 are each provided with an extension which extends below the base plate 242. The lower ends of these extensions are provided with brackets 252 and 254 which are pivotally secured to a housing and a piston rod of a double acting pneumatic piston and cylinder assembly 256. With a piston rod 258 of the piston and cylinder assembly 256 extended, the side walls 244 and 246 are in a vertical position which the side walls assume when a bag is being filled. When the piston rod 258 is retracted, the side walls 244 and 246 pivot about their horizontal axes to an open position as shown in phantom line in FIG. 6 to allow one bag to be removed and a new bag to be positioned on the table.

To operate the machine one person is required to load the hopper and a second person is required to carry out the bagging operation. At the start of a cycle the hold down gates 38 and 40 are raised and in an open position. The ram 42 is at one extreme end of the hopper thereby defining an open cavity into which insulating material in the form of batts of insulation, rolls of insulation or folded batts insulation can be placed. The ram 176 is withdrawn into portion 162 of the loading chute.

The insulation materials are stacked side by side in the hopper 22. If batts are being placed in the hopper they are stacked with their 15 or 23 inches dimension extending in a vertical direction and their 48 inches dimension extending transversely of the hopper. While the insulation is being stacked in the hopper 22 a bag is placed over the discharge portion of the chute 24 or 26 to be used in the bagging operation by the bagger. The bagger then actuates a conventional control 260 for the bag clamps 222 used with that chute and the open end of the bag is clamped between the chute and the plates 228 of the bag clamps. At the same time, the side walls 244 and 246 of the bag table which are in their spread position when the bag is being placed over the chute are brought to an upright position by pneumatic cylinder 256 to reinforce the bag while it is being loaded. The clamps 220 prevent the bag from being forced off the end of the chute as the bag is being loaded and the side walls 244 and 246 of the bagging table prevent the bag from bursting during the filling operation.

When a sufficient quantity of material has been placed in the hopper the operator filling the hopper activates a conventional control system 262 to commence the cycle. Upon actuation of the cycle, the piston rods of pneumatic cylinders 74 and 76 are extended to pivot the gates 38 and 40 down to a horizontal position where they cover the normally open top of the hopper. In this way, the gates prevent the batts from being pushed upward and help guide the batts into the loading chute 24 or 26 being filled. As soon as the gates are in position the drive motor 120 for the ram 42 is activated by a suitable limit switch that is contacted by the gates and the ram 42 is driven across the hopper. As the ram moves across the hopper the insulation is compressed between the ram 42 and the side wall 168 of the loading chute. The ram continues across the hopper until the insulation is ejected from the hopper and placed in the loading chute in a compressed state with the ram acting as one side wall of the loading chute. Upon reaching this position, conventional limit switches are actuated by the ram 42 to cause the gates 38 and 40 to open and the ram 176 to advance within the confines of the chute 24 or 26 to eject the insulating materials in a compressed state from the discharge opening of the chute and into the bag which is clamped in place about the end of the chute. When the ram 176 reaches the extremity of its travel in the forward direction conventional limit switches are actuated to reverse motor 198 and cause the ram to be withdrawn to portion 162 of the chute. The limit switches also cause the bag clamps to release and the side walls 244 and 246 of the bag table to swing into their outward position. Thus, the bagger can remove the bag from the end of the chute, staple the bag closed and load it on a cart for transportation to storage.

While this action is being carried out, the operator is stacking insulation into the hopper and a bag has been placed on the other loading chute and clamped in place for the second half of the cycle. When the operator has placed a sufficient quantity of insulation in the hopper, he again activates the controls 262 to start the second half of the cycle. The second half of the cycle is the same as the first half of the cycle with the exception that the ram is moving from adjacent the loading chute just used in the packaging operation to the opposite loading chute. Consequently, the material is compressed into the opposite loading chute and ejected from this loading chute into the bag clamped on the discharge portion of that chute.

When more material is to be packaged per bag than can be placed in the hopper 22, the operation of the machine is changed somewhat. The hopper is loaded and operator activates a control which causes the ram 42 to move across the hopper but prevents the actuation of the drive motor 198 for ram 176 by the limit switches at the ends of the hopper. Thus, once the ram 42 reaches the end of the hopper the gates 38 and 40 are raised but the ram 176 is not activated. When the ram 42 travels back to the other end of the hopper 22, the fingers 148 and 150 retain the compressed material in the chute. For the second compression stroke of the ram 42, the normal control is activated and the apparatus functions as outlined above when a package is being filled with one load of material from the hopper.

By activating reversible motor 64 the height of the hopper 22, the ram 42 and the discharge openings of chutes 24 and 26 can be adjusted to accommodate the particular size of material being packaged. The controls, motors and drive systems utilized are all conventional and it is contemplated that equivalent mechanisms can be utilized without departing from the scope of the present invention.

What we claim is:

1. Apparatus for packaging compressible materials comprising:

hopper means, said hopper means having a longitudinal center line, said hopper means having first and second side walls extending parallel to said longitudinal center line, said hopper means having a bottom wall extending between and secured to said side walls, said hopper means having an open top, and said hopper means having open ends;

first ram means carried within said hopper means for compressing materials, said first ram means extending between said side walls and having a material engaging surface facing each of said open ends, said first ram means being movable relative to said hopper means in a direction parallel to said longitudinal center line and perpendicular to said open ends;

means for moving said first ram means back and forth across said hopper means in the direction parallel to the longitudinal center line and perpendicular to said open ends;

chute means adjacent each of said open ends for receiving the materials from said hopper means which are compressed by said first ram means, each of said chute means having a longitudinal center line perpendicular to the longitudinal center line of said hopper means, each of said chute means having a lateral opening therein defined by one of said open ends of said hopper means, and each of said chute means having an open discharge end for discharging compressed materials into package means;

second ram means carried in each of said chute means and movable parallel to the longitudinal center lines of said chute means; and means for moving said second ram means back and forth in the direction parallel to the longitudinal center lines of said chute means.

2. An apparatus as claimed in claim 1 including:
closure means for closing off said open top to confine compressible materials within said hopper.

3. An apparatus as claimed in claim 1 including:
means to adjust the size of said hopper means, said first ram means and said discharge end of said chute means, to accommodate compressible materials of various sizes.

4. An apparatus as claimed in claim 1 including:
bag holding means adjacent said discharge openings for holding bags in place over said discharge openings while compressed material is inserted into the bags by means of said second ram means.

5. An apparatus as claimed in claim 4 including:
bag table means for supporting bags while compressed material is being inserted into the bags, said bag table means having means for confining the bags during insertion of compressed material to alleviate stresses on the bags as the compressed material expands in the bags.

6. An apparatus as claimed in claim 1 including:
means adjacent said open ends of said hopper to maintain material which has been compressed and deposited in said chutes by said first ram means in a compressed state after said first ram means has been withdrawn from contact with said material.

7. A method of packaging compressible materials comprising:
placing units of compressible material side by side within a compression chamber having first and second open ends;
compressing the units placed in the compression chamber;
expelling the units from the first open end of the compression chamber into a first chute means;
expelling the units, while still compressed, from an open end of the first chute means into package means;
placing additional units of compressible material side by side within the compression chamber;
compressing the additional units placed in the compression chamber;
expelling the additional units from the second open end of the compression chamber into a second chute means; and
expelling the additional units, while still compressed, from an open end of the second chute means into a package means.

8. A method as claimed in claim 7 including:
clamping open ends of said package means about the open ends of said first and second chute means while said units are being inserted into said package means.

9. A method as claimed in claim 8 including:
confining said package means while said units are being inserted into said package means to alleviate stresses on said package means as the compressed units expand within said package means.

10. A method of packaging compressible materials comprising:
placing a first set of units of compressible material side by side within a hopper having a bottom wall, side walls, first and second open ends and an open top;
compressing the first set of units placed in the hopper;
expelling the first set of units from the first open end of said hopper into a first chute means;
placing a second set of units of compressible material side by side within the hopper;
compressing the second set of units placed in the hopper while maintaining the first set of units in a compressed state in the first chute;
expelling the second set of units from the second open end of the hopper into a second chute means;
placing a third set of units of compressible material side by side in the hopper;
compressing the third set of units placed in the hopper while maintaining the second set of units in a compressed state in the second chute means;
expelling the third set of units from the first open end of the hopper into the first chute; and
expelling the first and third sets of units from an open end of the first chute means into a package means.

11. Apparatus for packaging compressible materials comprising:
hopper means, said hopper means having a longitudinal center line, said hopper means having first and second side walls extending parallel to said longitudinal center line, said hopper means having a bottom wall extending between and secured to said side walls, said hopper means having an open top, and said hopper means having an open end;
a first ram means for compressing materials carried within said hopper means, said first ram means extending between said side walls, said first ram means being movable relative to said hopper means in a direction parallel to said longitudinal center line and perpendicular to said open end;
means for moving said first ram means back and forth across said hopper means in the direction parallel to the longitudinal center line and perpendicular to said open end;
chute means adjacent said open end for receiving the materials from said hopper means which are compressed by said first ram means, said chute means having a longitudinal center line perpendicular to the longitudinal center line of said hopper means, said chute means having a lateral opening therein defined by said open end of said hopper means, and said chute means having an open discharge end for permitting the discharge of compressed materials from said chute means;
a second ram means carried in said chute means, said second ram means being movable parallel to the longitudinal center line of said chute means;
means for moving said second ram means in the direction parallel to the longitudinal center line of said chute means, and
bag holding means adjacent said discharge opening for holding a bag in place while compressed material is inserted into the bag by means of said second ram means, said bag holding means comprising a bag table means for supporting a bag while compressed material is being inserted into the bag, said bag table having means for confining the bag during insertion of compressed material to alleviate stresses on the bag as the compressed material expands in the bag.

12. Apparatus for packaging compressible materials comprising:

a compression chamber, said compression chamber having a longitudinal center line extending between open ends of said compression chamber, and said compression chamber having an opening through which materials can be introduced into said compression chamber in a side by side arrangement for compression, first ram means carried within said compression chamber for compressing materials, said first ram means having material engaging surfaces extending transverse with respect to said center line and facing each of said open ends, said first ram means being movable relative to said compression chamber in a direction parallel to said longitudinal center line and perpendicular to said open ends;

means for moving said first ram means back and forth across said compression chamber in the direction parallel to the longitudinal center line and perpendicular to said open ends;

chute means adjacent each of said open ends for receiving the materials from said compression chamber which are compressed by said first ram means, each of said chute means having a longitudinal center line perpendicular to the longitudinal center line of said compression chamber, each of said chute means having a lateral opening therein defined by one of said open ends of said compression chamber, and each of said chute means having an open discharge end for discharging compressed materials into package means;

second ram means carried in each of said chute means and movable parallel to the longitudinal center lines of said chute means; and means for moving said second ram means back and forth in the direction parallel to the longitudinal center lines of said chute means.

* * * * *

PO-1050
(5/69)

UNITED STATES PATENT OFFICE
CERTIFICATE OF CORRECTION

Patent No. 3,818,673             Dated June 25, 1974

Inventor(s) Forrest Theodore Rollins et al

It is certified that error appears in the above-identified patent and that said Letters Patent are hereby corrected as shown below:

The assignee should read Johns-Manville Corporation instead of Naremco, Inc. Column 3, line 67, "103" should read --102--.

Signed and sealed this 8th day of October 1974.

(SEAL)
Attest:

McCOY M. GIBSON JR.           C. MARSHALL DANN
Attesting Officer             Commissioner of Patents